April 20, 1965 R. P. AUYANG ET AL 3,179,924

PHOTOGRAPHIC DATA STORAGE SYSTEM

Filed Dec. 24, 1962 4 Sheets-Sheet 1

INVENTORS
RAYMOND AUYANG
ROBERT J. SIPPEL
PAUL W. WOO
EDWARD J. WROBLEWSKI

BY Robert W. Berray

ATTORNEY

PHOTOGRAPHIC DATA STORAGE SYSTEM

Filed Dec. 24, 1962 4 Sheets-Sheet 2

April 20, 1965 R. P. AUYANG ET AL 3,179,924

PHOTOGRAPHIC DATA STORAGE SYSTEM

Filed Dec. 24, 1962 4 Sheets-Sheet 3

United States Patent Office 3,179,924
Patented Apr. 20, 1965

3,179,924

PHOTOGRAPHIC DATA STORAGE SYSTEM

Raymond P. Auyang, Robert J. Sippel, and Paul W. Woo, Poughkeepsie, and Edward J. Wroblewski, Millbrook, N.Y., assignors to International Business Machines Corporation, New York, N.Y., a corporation of New York Filed Dec. 24, 1962, Ser. No. 246,805
10 Claims. (Cl. 340—173)

This invention relates to a photographic data storage system and more particularly to a photographic data storage system wherein during the recording operation, indicia are recorded on the storage medium to provide random access during the reading operation and control of the deflection of a readout point of light to provide proper tracking of the light along a track of recorded data.

Semi-permanent memory systems have been devised utilizing photographic techniques for the storage of data. In these systems, data to be stored modulates the beam of a cathode ray tube. During recording, the beam of the cathode ray tube impinges on a particular spot on the scope of the cathode ray tube corresponding to an address of the data being stored on the photographic storage medium. Through a lens system, the light given off by the phosphorous luminescence of the cathode ray tube face exposes one spot of the photographic storage medium. By deflecting the beam according to an address, the entire data to be stored is serially transferred to the photographic film which is then moved out and developed.

In reading back the data stored on the photographic storage medium, a frame of the film is first brought into fixed registration with respect to an optical lens system and the cathode ray tube. The cathode ray tube deflection plates which are controlled by an address register can randomly scan any spot position on the film and read out the stored data serially. When high storage density such as 1024 bits x 1024 bits per 35 millimeter film is considered, it is quite obvious that alignment of the film with respect to the optical system and the cathode ray tube is extremely critical in order that films written on one machine can be successfully read back from another.

To provide inter-changeability between machines and random access to data stored on a photographic storage means, means must be provided, aside from the problem of initial film registration, to accurately control the spacing and linearity of a recorded track of information, and means for correcting mechanical misalignment and differences in the electrical properties of different readout devices.

It is a principal object of this invention to provide a photographic data storage system capable of high density operation, and random access to serially recorded information.

It is another object of this invention to provide a photographic data storage system on a plurality of parallel, spaced-apart record tracks wherein the location of each of the tracks is recorded on the storage member along with data.

It is a further object of this invention to provide a photographic data storage system wherein the centerlines of a plurality of parallel, spaced-apart record tracks are defined on the storage member.

It is an additional object of this invention to provide a photographic data storage system wherein during the recording process, indicia are recorded on the storage member to uniquely define the position on the storage member of each of a plurality of parallel, spaced-apart data tracks.

It is another object of this invention to provide a photographic data storage system wherein the centerlines of a plurality of parallel, spaced-apart data tracks are defined by a permanent reference means utilized to control the spacing of the data tracks during recording.

It is also an object of this invention to provide a photographic data storage system wherein during readout of serially recorded information, access to the centerline of a particular one of a plurality of parallel, spaced-apart record tracks is achieved.

It is an additional object of this invention to provide a photographic data storage system wherein during the readout of serially recorded data, access to the centerline of a particular one of a plurality of parallel, spaced-apart data tracks is achieved by utilizing indicia on the storage member placed there during the recording of the data.

It is also an object of this invention to provide a photographic data storage system wherein during the readout of the serially recorded information, the readout means is caused to sweep along the centerline of a particular one of a plurality of parallel, spaced-apart record tracks under control of indicia associated with each of the record tracks provided during the recording of data on the record track.

It is also an object of this invention to provide a photographic data storage system wherein during the recording of serially received data, means are provided at the completion of the recording of a track of data to return the recording means to the point of beginning to insure that the particular track recorded is parallel to other tracks recorded.

These and other objects, features, and advantages are realized in a preferred embodiment of the invention which utilizes a point source of light which is modulated by data to be stored for selectively exposing a photographic film. Means are provided for sweeping the point of light across the storage medium to produce a track of serially recorded data. Stationary reference means are provided with respect to the point source of light to accurately define the centerline of a plurality of parallel, spaced-apart tracks to be recorded on the storage medium. Prior to the sweep of the point of light across the storage medium, means are provided for accurately positioning the point of light to a desired centerline in response to the reference means.

During the sweep of the point of light across the storage medium for recording data, means are provided for interrupting data storage to periodically record indicia defining the centerline of the track. Means are also provided during the sweep of the point of light across the data storage medium for recording indicia along the track which defines the position of the track on the storage medium. At the completion of the recording of a data track, the point of light is swept back to the point of beginning to provide means for checking that the end point of the track is within a predetermined distance with respect to the beginning of the track in a direction normal to the track length.

During the readout of information stored on the photographic storage medium, a frame of the photographic storage medium containing the plurality of parallel, spaced-apart data tracks is positioned in cooperative relationship with the point source of light and a light responsive means which provides an electrical output proportional to the amount of light received from the point of light through the data storage medium. Means are provided to control the deflection and sweeping means for the point of light to position the point of light on the centerline of an identified one of the data tracks using centerline defining indicia and the position defining indicia previously recorded. When the identified track has been accessed, and the point of light is positioned on the track centerline, means are provided for sweeping the point of light along the centerline of the track under control of the previously recorded indicia defining the track centerline. The recorded data is read out during the sweep of the point of light along the track centerline in accordance with the amount of light received by the light responsive means.

The foregoing and other objects, features and advantages of the invention will be apparent from the following more particular description of a preferred embodiment of the invention, as illustrated in the accompanying drawings.

Figure 1:
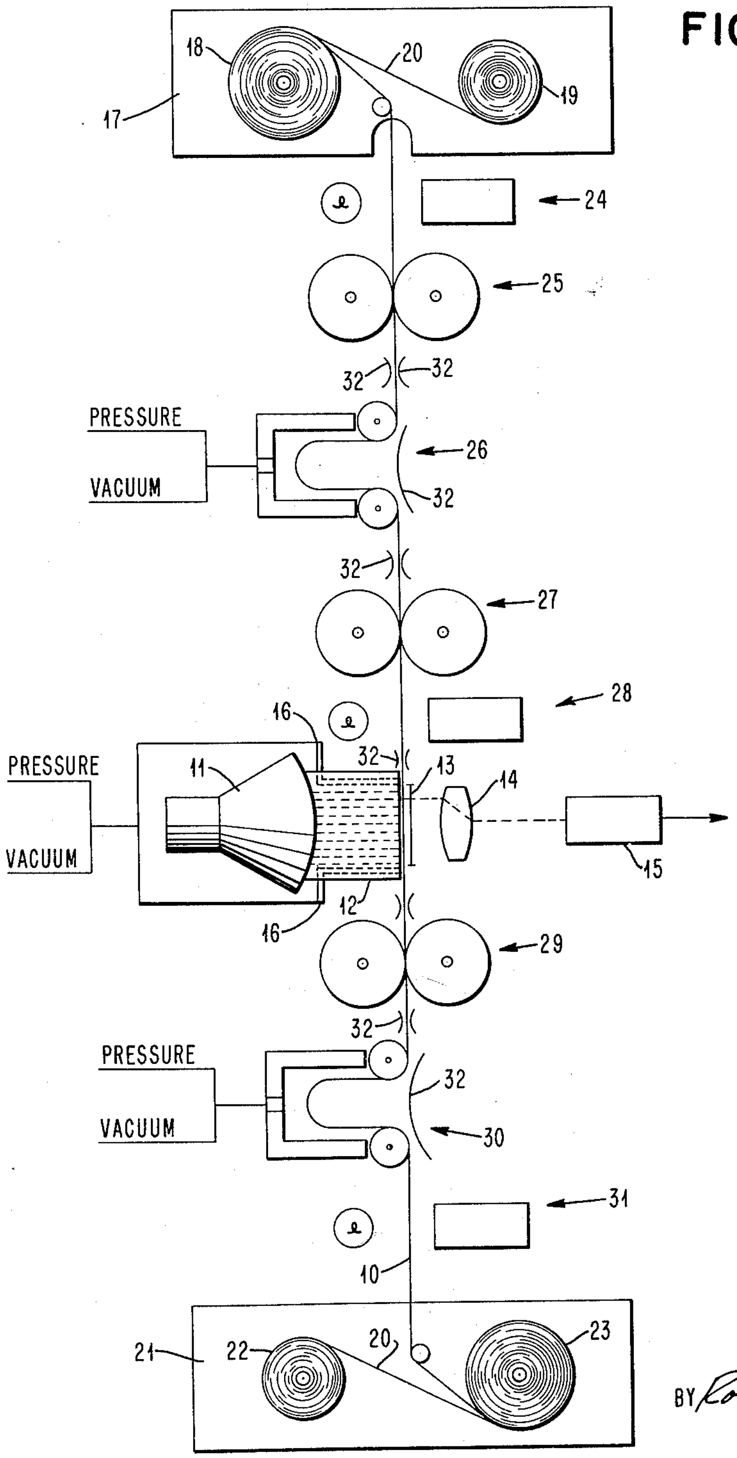
FIGURE 1 is a schematic representation of a mechanism for transporting a photographic storage film to a recording or reading station.

In FIGURE 1 there is shown schematically mechanism for threading and transporting a photographic storage film 10 to a photographic recording or reading station. The recording or reading station consists of a flying spot scanner or cathode ray tube 11 having a fiber optics bundle 12. In front of the fiber optics bundle 12, and on the other side of the photographic film 10, is a stationary reference plate 13 which is utilized to define the centerlines of a plurality of parallel, spaced-apart data tracks making up a frame of data. During recording of data, the cathode ray tube beam is deflected and modulated with data to provide a point source of light utilized to record the data on tracks of the photographic film 10. During reading, the cathode ray tube beam is swept across the storage film 10 to provide, through suitable lens system 14, modulated light to a photo-multiplier tube 15. The photo-multiplier tube 15 provides an electrical output having an amplitude proportional to the amount of light transmitted from the fiber optics 12 point source of light through the storage film 10. The mounting of the fiber optics bundle 12 is provided with suitable ports 16 so that air pressure or vacuum may be applied to the face of the fiber optics bundle 12. Air pressure is applied through ports 16 to the face of the fiber optics bundle 12 when the film 10 is being transported past the fiber optics bundle 12. When a frame of the film has been positioned for recording or reading, vacuum is applied through port 16 to hold the film 10 against the face of the fiber optics bundle 12.

The film 10, whether exposed to data or unexposed, is contained in a cartridge 17. The cartridge would be air and light tight and would consist of a film reel 18 and reel 19. The film 10 would be contained on reel 18 along with a protective tape 20 separating each layer of the film 10. When the cartridge 17 is mounted in the machine, and the film 10 transported to the recording and reading station, the protective tape 20 will be wound onto reel 19 as the film 10 is being unwound from reel 18. Another cartridge 21 will be provided including a reel 22 and a reel 23 for receiving the photographic film 10. Cartridge 21 also has a protective tape 20 which is utilized to separate adjacent layers of the film 10 as it is wound onto reel 23.

Various other mechanisms of FIGURE 1 along the film path are: photocell assembly 24; suitably driven threading rollers 25; a vacuum column assembly 26; suitably driven main drive rollers 27; a photocell assembly 28; suitably driven threading rollers 29; vacuum column assembly 30; and photocell assembly 31. Along the path of the film 10 are suitable guide members 32.

Threading of the film 10 is initiated by placing the cartridge 17 in the device. The door in the cartridge 17 will be opened by insertion in the machine. When a start switch is depressed, suitable drive means will rotate reels 18 and 19. Reel 18 will pay out a leader from the cartridge 17. At this time, pressure is applied to the vacuum column assembly 26, the fiber optics bundle 12, and the vacuum column assembly 30. Threading rollers 25 and 29 will be engaged transporting the film leader through the film path with the applied pressure forcing the film against the guide members 32.

As the leader passes photocell assembly 31, the film take-up reel 23 and protective tape reel 22 will be suitably driven to grasp the leader for further winding. Either through a mark on the film sensed by photocell 31 or suitable notches in the edge of the film engaged by the follower of a microswitch, the threading rollers 25 and 29 and the take-up reel 23 will be stopped. This signal also causes vacuum column assembly 30 to switch from pressure to vacuum. As the loop is drawn into vacuum column assembly 30, a switch responsive to the loop position in the column will switch vacuum column assembly 26 from pressure to vacuum. As the loop of film 10 is drawn into vacuum column assembly 26, a vacuum switch will signal the end of the threading operation and transfer control to the machine logic. At the completion of the threading operation, the threading rollers 25 and 29 are retracted to clear the film path. The geometry of the film path is designed to keep the film 10 away from the guides 32 after threading. The film 10 only makes contact along the edges at the main drive rollers 27 to prevent any damage to the photographic emulsion.

The advance and registration of frames of the photographic film 10 will be under control of the drive rollers 27 and the photocell assembly 28 which would sense frame distinguishing marks. Photocell 28 could be replaced by a follower and microswitch which engages notches in the edge of the film 10. Through a counter, and suitable drive connections to the drive rollers 27, a particular one of several frames on the film 10 can be registered between the fiber optics bundle 12 and the stationary reference plate 13. It is the object of the present invention to alleviate the requirement for exact frame registration while still maintaining reliable readout of the information.

During unloading of the film, the threading rollers 25 and 29 remain disengaged. Rewinding of the film 10 is initially under control of the main drive rollers 27 and take-up reel 18 until a mark indicating the beginning of the film leader is sensed by photocell 24. This mark will insure that the photographic portion of the film 10 has been wound on the cartridge spool 18. At this time pressure is applied to both vacuum column assemblies 26 and 30 to remove the leader loops. The threading rollers 25 and 29 are then engaged to provide tension on the leader during the remainder of the rewind by reel 18. The take-up reel 18 continues until shortly after the end of the leader is sensed by photocell 24. This insures that the entire film strip including the leader is wound in the cartridge 17. This same signal also controls the closing of the automatic door mechanism of the cartridge 17.

Figure 2:
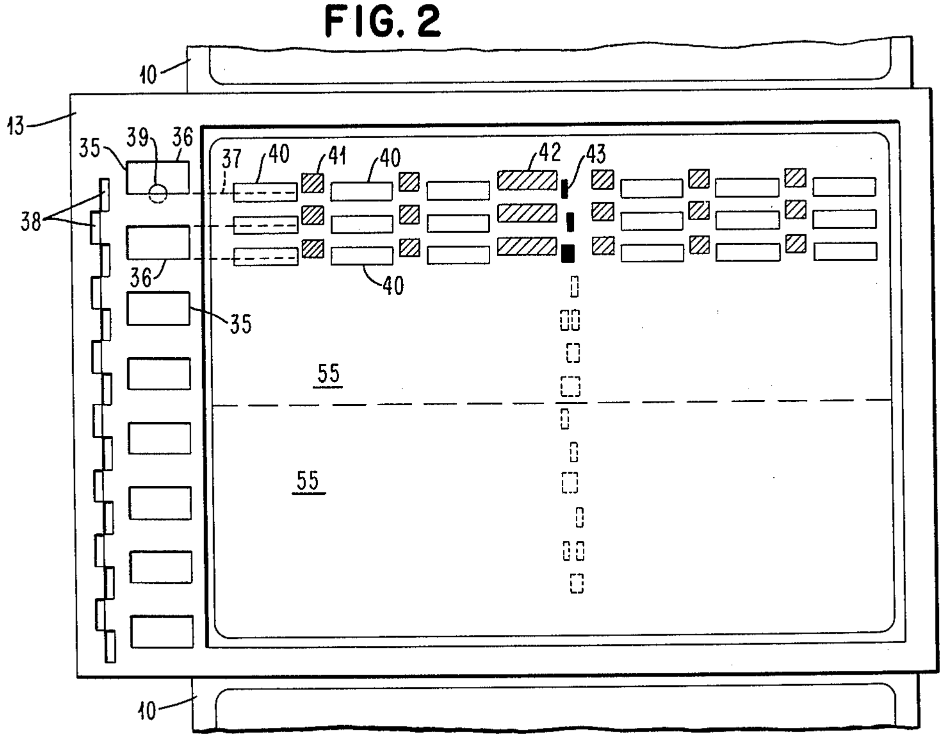
FIGURE 2 is a schematic representation, exaggerated in dimensions, showing a frame of photographic storage film adjacent a stationary reference plate and further showing the format of the recorded information and track location defining indicia.
Figure 3:
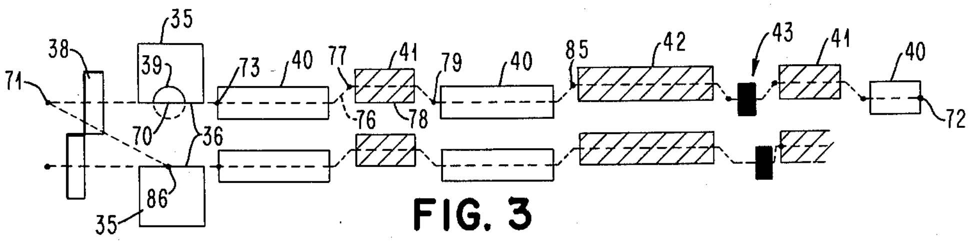
FIGURE 3 is a schematic representation showing the path of a point source of light across a storage film during a recording process.
Figure 4:
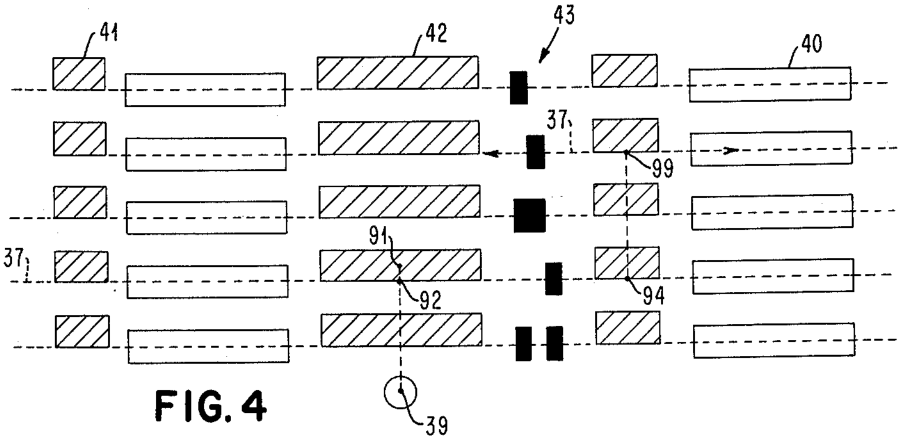
FIGURE 4 shows schematically a portion of a plurality of parallel, spaced-apart data tracks containing recorded information and the path of a point source of light seeking a particular one of the data tracks on the photographic storage member.
Figure 5:
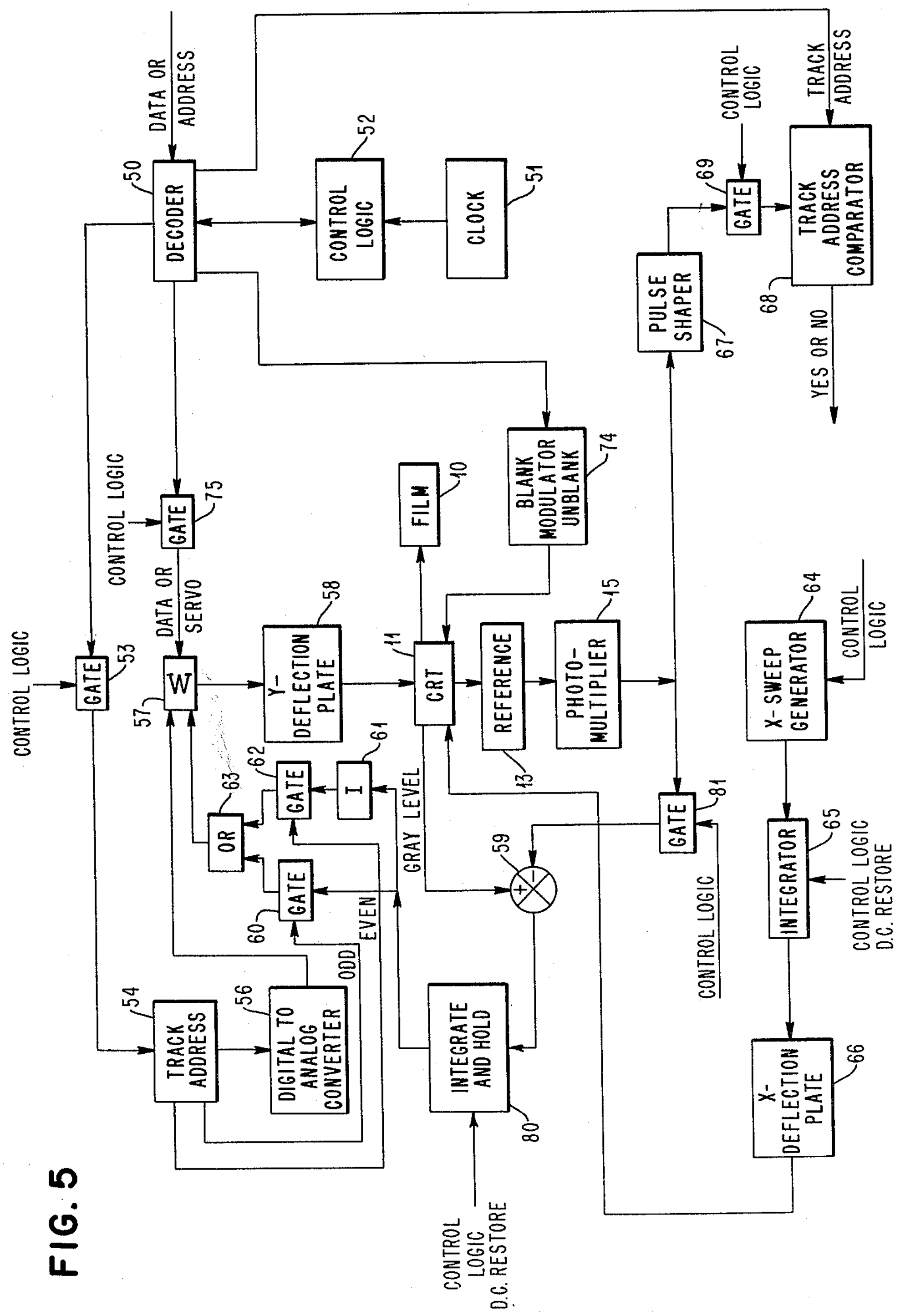
FIGURE 5 shows schematically the logic required to control recording of data and track location defining indicia during the recording of data on a photographic storage film.

FIGURES 2, 3, and 5 will be utilized to describe how data is recorded on the photographic storage film 10 once the film has been registered between the point source of light (cathode ray tube 11 and fiber optics bundle 12)

and the stationary reference plate 13. In FIGURES 2, 3, and 4, dimensions, spacing and relative sizes have been greatly exaggerated to explain the operation of the invention. The actual values will depend greatly on the resolution of the optical system, stability of the electrical system, and response times of various electrical circuits. The stationary reference plate 13, shown in FIGURE 2, has along one side thereof a grating or series of openings 35. The edges 36 of the openings 35 define the centerlines of adjacent parallel, spaced-apart tracks along which data is to be recorded on the film 10. Adjacent tracks of data on the storage film 10 are further identified as being odd or even by the checkerboard pattern 38 in the stationary reference plate 13.

Prior to writing data on a frame of the film 10, a spot of light 39, produced by the point source including cathode ray tube 11 and the fiber optics bundle 12 of FIGURE 1, will be centered on one edge 36 of the first opening 35. The spot 39 is adjusted and centered on the edge 36 of opening 35 by comparing the amount of light transmitted to the photo-multiplier tube 15 with a standard gray level voltage which indicates that only half the light from spot 39 is being transmitted through the grating 35. When the spot 39 has been centered on a centerline 37, the spot is deflected to the checkerboard pattern 38 to determine whether the particular track is an odd or even track. When the spot 39 has been centered on a centerline 37, and the address checked, means are initiated to sweep the spot 39 across the storage medium 10 to record data. Predetermined amounts of data are recorded in areas 40 along the centerline 37. Periodically the data recording is interrupted to record on the storage member indicia defining the track location. The indicia defining the track location includes exposed areas 41, the bottom edge of which defines the centerline of the track. The relative lengths of the data areas 40 and the centerline defining areas 41 will depend on the stability of the deflecting means for the spot 39 and the response time of the deflecting means in the reading device which must respond to signals developed from the centerline defining areas 41.

Near the center of each of the tracks of information, a longer area 42 of track centerline defining indicia is recorded. Immediately following the area 42, further track location indicia in the form of address information is recorded for the track. The address information 43 uniquely defines the position of the track on the storage member 10 in a direction normal to the track length. The track address 43 for each of the tracks will be utilized during the reading operation for locating a particular track in response to identification of a track to be read. Immediately following the address indicia 43, another area 41 of centerline defining indicia is recorded after which the remainder of the track is recorded with alternate data areas 40 and centerline defining areas 41.

Immediately following the recording of the last bit of information on a particular track, the spot 39 is blanked and returned to the checkerboard pattern 38. Reading of the odd or even indication from the pattern 38 and comparing this with the initial setting of the odd or even condition of the track being recorded indicates whether or not the end of the track written is within a predetermined distance of the beginning of the track in a direction normal to the track length. If the spot 39 produces an output from the pattern 38 corresponding with the initial address, no error condition is recognized. If the spot 39 has drifted beyond certain limits, such that a different address is read, an error condition is sounded to alert the operator. After this check, the spot 39 is deflected normal to the track length to the next edge 36 which defines the centerline of the next addressed track to be recorded and the same procedure previously discussed is initiated. As before, the address of the following track will be recorded in the form of unique combinations of clear and opaque areas 43 defining the track address in binary notation.

A detailed explanation of the recording operation can be followed in connection with FIGURES 3 and 5. In FIGURE 5, various blocks have been labeled with the same numerals as found in the schematic drawing of the mechanisms shown in FIGURE 1. In FIGURE 5, data or address information from an input device is placed in a decoder 50. Control of the operation of various blocks in FIGURE 5 is by a clock 51 and control logic 52. The control logic 52 contains necessary counters and timing devices to determine when data is to be recorded, when centerline defining indicia is to be recorded, and when address indicia is to be recorded. It further controls the deflection of the spot of light during various intervals of the recording process.

Assuming that the decoder 50 has received the address of the first track of data to be recorded in a particular frame on the film 10, control logic 52 will be effective at a gate 53 to enter the address information into a track address register 54. A particular track within a frame of the storage film 10 will be identified by lower order bits which define the track position within zones indicated by higher order bits. In FIGURE 2, there is depicted two zones 55 within which 7 tracks of information will be recorded and identified by three lower order bits of the address information. A digital to analog converter 56 converts the digital address to a voltage which is applied to a summer 57. The output of summer 57 is applied to the Y deflection plate 58 of the cathode ray tube 11 to position the spot of light 39 near the bottom edge 36 of the first opening 35 in the reference plate 13.

The position of spot 39 relative to the track centerline 37 is determined by applying the output of the photo-multiplier 15 through a gate 81 to a comparator 59. The other input to comparator 59 is a standard voltage called gray level which is equal to the output of photo-multiplier 15 when only half the light from spot 39 is transmitted through the opening 35. The plus or minus difference signal from the comparator 59 is applied to an integrate and hold circuit 80. The output of the integrate and hold circuit 80 is applied to a gate 60 and, through an inverter 61, to a gate 62. The outputs of gates 60 and 62 are applied through an OR circuit 63 to the summer 57. Either gate 60 or 62 will be effective depending on whether the spot 39 is seeking the centerline of an odd or even track. If there is too much light from the photo-multiplier 15 when the spot 39 is seeking an odd address, the beam must be deflected downward. If there is too much light from photo-multiplier 15 when the beam is seeking an even address, the beam must be deflected upward. As the position of the spot 39 is corrected by the operation of the integrator 80, the difference indication at comparator 59 will be reduced to zero at which time a hold circuit will be rendered effective to maintain the voltage required to correct the initial positioning of the spot 39. The voltage now applied to the deflection plate 58 through summer 57 represents the required Y deflection to define the centerline of the addressed track. When the spot 39 has been centered, the control logic deconditions gate 81 so that further outputs from the photo-multiplier 15 during the recording process are not effective to change the setting of the hold circuit 80.

When the spot 39 is centered on the centerline such as at point 70 of FIGURE 3, the control logic will initiate a sweep of the spot 39 in the X direction through an X sweep generator 64, and integrator 65 which applies the voltage to the X deflection plate 66 of the cathode ray tube 11. The initial X position of the spot 39 is controlled by the control logic D.C. restore applied to the integrator 65. This would have initially placed the spot 39 within the opening 35 of the addressed track.

When the spot has been centered on the addressed track, an initial check is made to see that the spot 39 has been centered on an odd address as called for by the track address in address register 54. The spot 39 is caused to sweep to the left to point 71 to provide an output from the photo-multiplier 15 in accordance with light transmitted through the opening 38. The output of the photo-multiplier 15 is shaped by a pulse shaper 67 and applied to a track address comparator 68 through a gate 69 opened by the control logic 52. The output from opening 38 indicating an odd address is compared with the lowest order position of the track address in the track address comparator 68 to provide a yes or no signal indicating that the spot is in fact centered on an odd address track centerline.

The presence of data in decoder 50 will initiate through the control logic 52 signals to the X deflection plate 66 of cathode ray tube 11 to sweep the point of light 39 across the storage film 10 to a point 72 at the end of the track to be recorded. When the spot of light 39 reaches the point 73, data in the decoder 50 will be applied to a modulator 74 which selectively blanks and unblanks the light emitted by the cathode ray tube beam in accordance with data to be recorded. The amount of data recorded in the data zones 40 along the track, will depend on the expected stability of readout devices and the desired amount of control to be applied during readout. When the predetermined amount of data has been recorded in the first data zone 40, the control logic 52 will condition a gate 75 and interrupt data recording. Conditioning of gate 75, for example at point 76 in FIGURE 3, applies a voltage to the summer 57 effective to deflect the spot 39 in a direction normal to the track length and by an amount equal to one-half the track width. At point 77 of FIGURE 3, the modulator 74 will record a predetermined number of spots on the film 10. The length of each of the areas 41 will be determined by the response time of spot positioning means to be discussed in connection with readout. Each of the areas 41 provides a discrete area along the track which has a lower edge 78 between opaque and clear areas on the film 10 which defines the centerline of the track being recorded. At the end of each of the track centerline defining areas 41, such as at point 79, the control logic 52 will decondition gate 75 to deflect the spot 39 back to the initial centerline 37. The modulator 74 will then be enabled to continue recording data in the next data area 40.

Alternate data areas 40 and centerline defining areas 41 are recorded until the spot 39 reaches a point 85 near the center of the data track. At this time the beam 39 is deflected one-half track width upward to record a longer track centerline defining area 42. At the completion of the recording of area 42, the beam 39 is returned to the track centerline 37 to record track position indicia 43 in the form of unique combinations of clear and opaque areas which define the lower orders of the track address within a particular one of the track zones. The original track address entered into the decoder 50 is utilized to control the modulator 74 for recording the track address 43. After completing the recording of the track address 43, the spot 39 is deflected upward to record another centerline defining area 41. Alternate data areas 40 and centerline defining areas 41 are recorded along the remainder of the track length.

When the spot 39 has swept across the entire width of the film 10 and reached point 72 at the end of the track, the control logic 52 blanks the cathode ray tube beam, restores the integrator 65 to return the spot 39 to point 71. The modulator 74 unblanks the beam during the sweep of the beam across opening 38 to provide an output through gate 69 to the track address comparator 68. This provides a check to insure that the end point 72 of the track has not drifted more than an amount to allow a correct comparison of the original odd or even condition of the track with the odd or even indication read during the fly-back to point 71. If the end point 72 of the track has drifted normal to the track length so that there is no comparison in comparator 68, an alarm is sounded indicating an error condition.

After completing the address check, the spot 39 is caused to be deflected in response to the next track address entered in track address register 54. The initial centering of the spot 39 at point 86 is accomplished as previously discussed, and the spot is deflected to the left to provide the comparison of the odd-even indication given by openings 38 with the lowest order position of the track address. The control logic 52 will then initiate another sweep across the storage medium 10 to record alternate areas of data 40 and areas 41 of centerline defining indicia. When the beam has reached the center portion of the track, the lower order bits of the track address will be recorded as at 43.

Recording in this manner will continue until a complete frame of the storage medium 10 has been exposed with a plurality of parallel, spaced-apart tracks, each of the tracks having areas of data, areas defining the centerline of the tracks, and areas defining the track's position on the storage medium relative to a direction normal to the track lengths.

Figure 6:
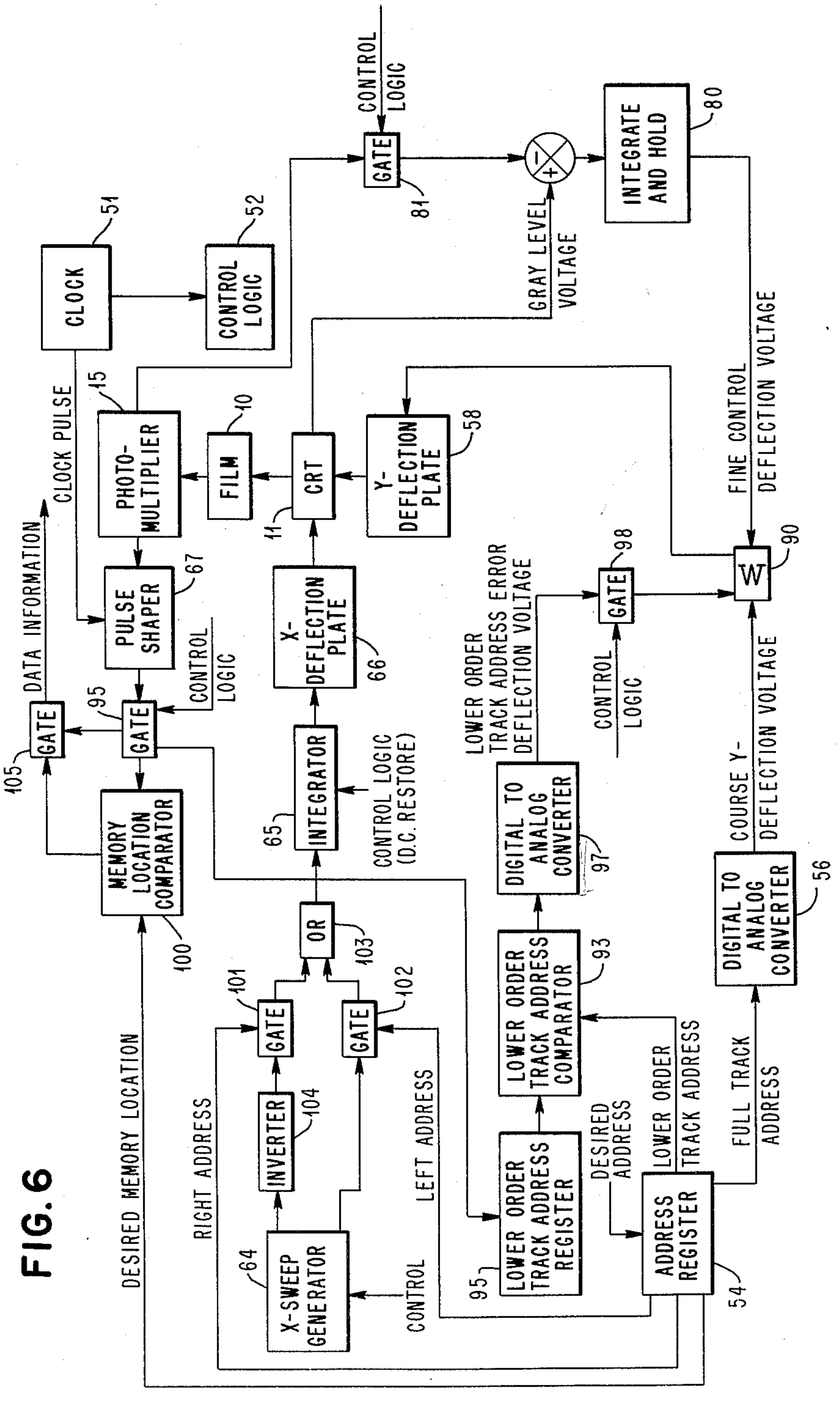
FIGURE 6 shows schematically the logic required to control the point source of light for reading out photographically recorded data on a particular data track of a photographic storage medium.

FIGURES 4 and 6 will be utilized to explain the operation of the invention in connection with readout of previously recorded information. Assuming that the desired frame of the film 10 has been positioned as accurately as possible with the mechanism shown in FIGURE 1, the next problem is to seek an identified one of the data tracks which is to be reproduced. The complete address of the identified track to be reproduced is entered in the address register 54. The control logic restores integrator 65 which provides a voltage to the X deflection plate 66 to deflect the cathode ray tube beam to position light spot 39 near the center of the frame within the track centerline defining areas 42. The complete track address is applied to digital to analog converter 56 to provide a course deflection voltage through a summer 90 to the Y deflection plate 58. The course positioning of the spot 39 will be sufficient to position the spot 39 within the proper zone 55 of the identified track, and, depending on the number of lower order bits utilized in the track address, within a predetermined distance of the addressed track.

When the spot 39 has been positioned in accordance with the course deflection such as at 91 in FIGURE 4, the control logic 52 will render gate 81 effective to transmit the photo-multiplier 15 output to comparator 59. Comparator 59 will again provide a plus or minus indication of the difference between the photo-multiplier 15 output and the standard gray level voltage. The plus or minus difference indication will again be applied to integrate and hold circuit 80 to adjust the position of the spot 39 through summer 90 and the Y deflection plate 58 to center the spot 39 on the centerline 37 of the closest data track, such as at 92 in FIGURE 4.

When the spot 39 has been positioned on the centerline 37 of a track, the control logic 52 will cause the integrator 65 to deflect the spot 39 to the right for the purpose of reading the address information 43 on the track. The lower order bits of the track address in address register 54 are applied to a track address comparator 93. During the sweep of the spot 39 from position 92 in FIGURE 4 to a position 94, a gate 95 receiving the output of pulse shaper 67 is conditioned by the control logic 52 to transmit the address 43 read to a lower order track address register 95. The reproduced address in the register 95 is compared with the address in address register 54 in the comparator 93. The output of comparator 93 is applied to a digital to analog converter 97 which produces a track address error deflection voltage which is applied through a gate 98 to the summer 90. The error deflection voltage applied to summer 90, when combined with the course voltage applied from digital to analog converter 56, provides a combined deflection voltage to the Y deflection plate 58 to position the spot 39 within one-half track width of the addressed track. At this time, the spot will be within one-half track width of the identified track centerline 37 near the edge of track centerline defining area 41. The photo-multiplier 15 output is compared with the gray level voltage at the comparator 59 and the plus or minus difference is utilized to provide a fine control deflection voltage to summer 90 effective to center the spot 39 on the centerline 37 of the identified track, such as at point 99 in FIGURE 4.

Any suitable means could now be provided for initiating a sweep of the spot 39 along the centerline 37 of the identified track to read out all of the information recorded on that track. However, additional selective access to a particular one of the data areas 40 can be achieved. The address initially entered into the address register 54 can also provide an indication of a particular one of the data areas 40 along the identified track which is to be reproduced. Each of the data areas 40 along the data tracks can be identified by its position to the right or left of the point 99 in FIGURE 4. It could be identified as a certain number of data areas 40 to the right or left of point 99, or each of the data areas 40 could include a recorded binary address. The data area 40 address is entered into a memory location comparator 100 in FIGURE 6. The address register 54 would provide an indication as to whether or not the data area address is to the right or the left of point 99 in FIGURE 4. This right address or left address indication is applied to a gate 101 and 102 respectively. The outputs of gates 101 and 102 are applied through an OR circuit 103 to the integrator 65 which cause the X deflection plate 66 to sweep the spot 39 along the identified track. The control logic 52 will initiate through the X sweep generator 64, a voltage which would normally move the beam to a left address through gate 102, or when inverted by an inverter 104 would cause the beam to sweep to the right through the operation of gate 101 when a right address is indicated. As the spot 39 is swept along the track, gate 95 will provide the data area 40 designations to the memory location comparator 100 until a comparison is reached. At this time a gate 105 will be conditioned to provide the output path of the data information which was requested.

Even though the initial positioning of the desired frame in the reading device causes angular skew or registration errors in a direction normal to the track lengths, the originally recorded track centerline defining areas 41 and address areas 43 will be utilized to control the accurate access and tracking of the spot 39 in the reading device along an addressed track centerline 37. Whenever the spot 39 is sweeping along the edge portion 78 of the track centerline defining areas 41, gate 81, comparator 59, and integrate and hold circuit 80 will be effective to provide a fine control deflection voltage to summer 90 to adjust spot 39 to the track centerline 37 for reading the immediately following data area 40. Mistracking of the spot 39 in the reading device along the track centerline 37, as mentioned previously, could be a result of angular skew in the original registration of the frame, or the electrical deflection circuitry of the reading device may not be as stable as that of the recording device.

There has thus been shown a photographic storage system which produces on the photographic storage medium during the recording of data, indicia which define the center line of the track being recorded. Also provided during the recording process is indicia which defines the track's position on the storage medium in a direction normal to the track lengths. A reference is provided during the recording operation which defines the centerlines of adjacent, parallel, spaced-apart tracks which are to be recorded across the photographic storage medium. Even though misregistration of a previously recorded data storage medium in a reading device results in the erroneous positioning of the readout spot of light in response to an identified track address, the system is capable of seeking out the identified track to center the reading spot of light on the centerline of the identified track. During readout of the data stored along the identified track, the previously recorded centerline identifying indicia provides the necessary control for adjusting the position of the light spot to compensate for angular misregistration of the frame and/or differences in the deflection circuitry to thus cause the beam of light to accurately sweep along the centerline of the track being reproduced. The photographic storage system has further provided means for providing random access to a particular data record on a particular data track.

While the invention has been particularly shown and described with reference to a preferred embodiment thereof, it will be understood by those skilled in the art that various changes in form and details may be made therein without departing from the spirit and scope of the invention.

What is claimed is:

1. A data storage system comprising:
   - a point source of light;
   - means to modulate said source in accordance with data to be stored;
   - means for deflecting said point of light;
   - a data storage member adapted to receive light from said point of light to store the data in the form of clear and opaque areas;
   - means for applying deflection signals to said deflecting means to initiate a sweep of said light along a track of said storage member to record the data presented by said modulating means;
   - and control means applying signals to said deflecting means and said modulating means, to periodically interrupt data storage and record on said storage member information related to said track location.

2. A data storage system comprising:
   - a point source of light;
   - means to modulate said source in accordance with data to be stored;
   - means for deflecting said point of light;
   - a data storage member adapted to receive light from said point of light to store the data in the form of clear and opaque areas;
   - means to cause a sweep of said point of light along a predetermined track centerline on said storage member to record the data presented by said modulating means along a predetermined length of track;
   - and control means applying signals to said deflecting means and said modulating means, to periodically interrupt data storage and record on said storage member information defining said track centerline and to record on said storage member information related to said track's relative position on said storage member.

3. A data storage system in accordance with claim 2 wherein said centerline defining means of said control means includes:
   - means periodically applying for a predetermined time deflection signals to said deflecting means to deflect said point of light normal to said track centerline by an amount equal to one-half the width of said track;
   - and means connected to said modulating means, operative during said predetermined time, to record on said storage member a discrete clear area, whereby said track centerline is defined by periodic discrete portions along said track having an edge between clear and opaque areas along said track centerline.

4. A data storage system in accordance with claim 2 wherein said track position recording means of said control means includes:
   - means connected to said modulating means, operative at the mid-point of said length of track, to record on said track a unique combination of clear and opaque discrete areas defining said track's position on said storage member normal to said track length.

5. A data storage system comprising:
a point source of light;
means to modulate said source in accordance with data to be stored;
a light responsive storage member adapted to receive light from said point of light to store the data in the form of clear and opaque areas;
reference means defining the centerlines of a plurality of tracks along which data is to be stored on said storage member;
first means for deflecting said point of light in the direction of said track centerlines;
second means for deflecting said point of light in a direction normal to said track centerlines;
means connected to said first and second deflecting means, responsive to the position of said point of light relative to said reference means, for centering said point of light on a particular one of said track centerlines;
means connected to said first deflecting means, operative when data is to be stored, to cause a sweep of said point of light across said storage member to record the data;
and control means applying signals to said second deflecting means and said modulating means, to periodically interrupt data storage and record on said storage member information defining said track centerline, and to record on said storage member information related to said track's position on said storage member relative to the centerlines of the other of said plurality of track centerlines.

6. A data storage system in accordance with claim 5 wherein said centerline defining means of said control means includes:
means periodically applying for a predetermined time deflection signals to said deflecting means to deflect said point of light normal to said track centerline by an amount equal to one-half the width of said track;
and means connected to said modulating means, operative during said predetermined time, to record on said storage member a discrete clear area, whereby said track centerline is defined by periodic discrete portions along said track having an edge between clear and opaque areas along said track centerline.

7. A data storage system in accordance with claim 5 wherein said track position recording means of said control means includes:
means connected to said modulating means, operative at the mid-point of said length of track, to record on said track a unique combination of clear and opaque discrete areas defining said track's position on said storage member normal to said track length.

8. A data storage system comprising:
a point source of light;
light responsive means adapted to receive light from said point of light for producing electrical signals having an amplitude proportional to the amount of light received from said point of light;
a photographic storage member positioned between said point of light and said light responsive means, operative to produce data-representing electrical signals from said light responsive means for reproducing data recorded in the form of discrete clear and opaque areas along a plurality of parallel, spaced-apart record tracks, each of said tracks having associated therewith, indicia recorded on said storage member defining the centerline of said track;
means for identifying a particular one of said data tracks to be reproduced;
means connected to said track identifying means and said light responsive means, operative in response to the amount of light transmitted through said track centerline defining indicia to center said point of light on the centerline of said identified track;
and means for causing a sweep of said point of light along said track centerline to reproduce the data recorded.

9. A data storage system comprising:
a point source of light;
light responsive means adapted to receive light from said point of light for producing electrical signals having an amplitude proportional to the amount of light received from said point of light;
a photographic storage member positioned between said point of light and said light responsive means, operative to produce data-representing electrical signals from said light responsive means for reproducing data recorded in the form of discrete clear and opaque areas along a plurality of parallel, spaced-apart record tracks,
each of said tracks having associated therewith a plurality of track centerline defining indicia in the form of edge portions between clear and opaque areas on said storage member, said edge portions being interspersed with data portions along said tracks,
each of said tracks further having associated therewith near the midpoint of said track and between two of said edge portions, indicia in the form of unique combinations of clear and opaque discrete areas defining said track's position on said storage member normal to said tracks;
first means for deflecting said point of light in the direction of said track centerlines;
second means for deflecting said point of light in a direction normal to said track centerlines;
means for identifying a particular one of said data tracks to be reproduced;
a standard voltage source providing a voltage equal to the voltage output of said light responsive means when receiving light from one-half said point of light;
means, including said first and second deflecting means, said identifying means and said standard voltage source for centering said point of light on one of said edge portions at one side of said track position defining indicia of said particularly identified track;
and means, including said first deflecting means, for sweeping said point of light along the centerline of said identified track to reproduce the data recorded.

10. A data storage system comprising:
a point source of light;
light responsive means adapted to receive light from said point of light for producing electrical signals having an amplitude proportional to the amount of light received from said point of light;
a photographic storage member positioned between said point of light and said light responsive means, operative to produce data-representing electrical signals from said light responsive means for reproducing data recorded in the form of discrete clear and opaque areas along a plurality of parallel, spaced-apart record tracks,
each of said tracks having associated therewith a plurality of track centerline defining indicia in the form of edge portions between clear and opaque areas on said storage member, said edge portions being interspersed with data portions along said tracks,
each of said tracks further having associated therewith near the midpoint of said track and between two of said edge portions, indicia in the form of unique combinations of clear and opaque discrete areas defining said track's position on said storage member normal to said track;
first means for deflecting said point of light in the direction of said track centerlines;
second means for deflecting said point of light in a direction normal to said track centerlines;
means for identifying a particular one of said data tracks to be reproduced;

a standard voltage source providing a voltage equal to the voltage output of said light responsive means when receiving light from one-half said point of light;

means, including said first and second deflecting means, and said identifying means for positioning said point of light near one of said centerline defining edge portions at one side of said track position defining indicia;

comparing means, responsive to said standard voltage and the amplitude of the output of said light responsive means, operative to adjust said second deflecting means to center said point of light on said edge portion;

means, including said first deflecting means and said light responsive means, for reading and storing said track position defining indicia;

means for comparing said track identifying means and the contents of said storage means to develop an error signal proportional to the difference between said identifying means and storage means;

means connected to said second deflecting means, responsive to said error signal for deflecting said point of light to said edge portion on the centerline of said identified track;

and means, including said first deflecting means, for sweeping said point of light along the centerline of said identified track to reproduce the data recorded, said comparing means being operative during the time said point of light is sweeping one of said edge portions, to maintain said point of light on said centerline.

No references cited.

IRVING L. SRAGOW, *Primary Examiner.*